May 31, 1938. F. MARASSO 2,119,018
COMBINED DIVIDER AND ROUNDER
Filed June 26, 1937 4 Sheets-Sheet 1

Inventor:
Fred Marasso,
by Charles O. Kerwey
his Atty.

May 31, 1938.  F. MARASSO  2,119,018
COMBINED DIVIDER AND ROUNDER
Filed June 26, 1937　　4 Sheets-Sheet 2
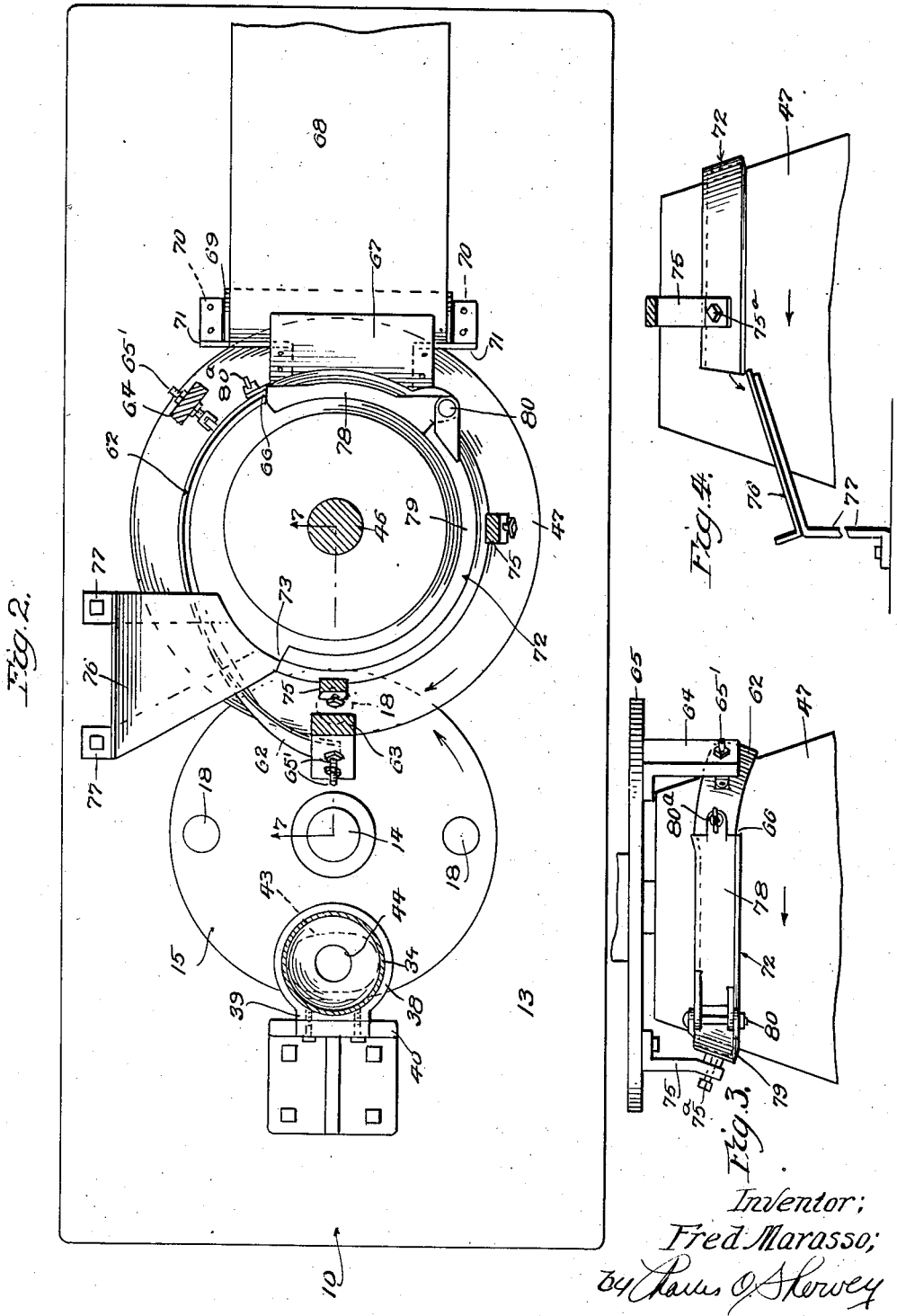
Inventor;
Fred Marasso;
by Charles O. Hervey
His Atty.

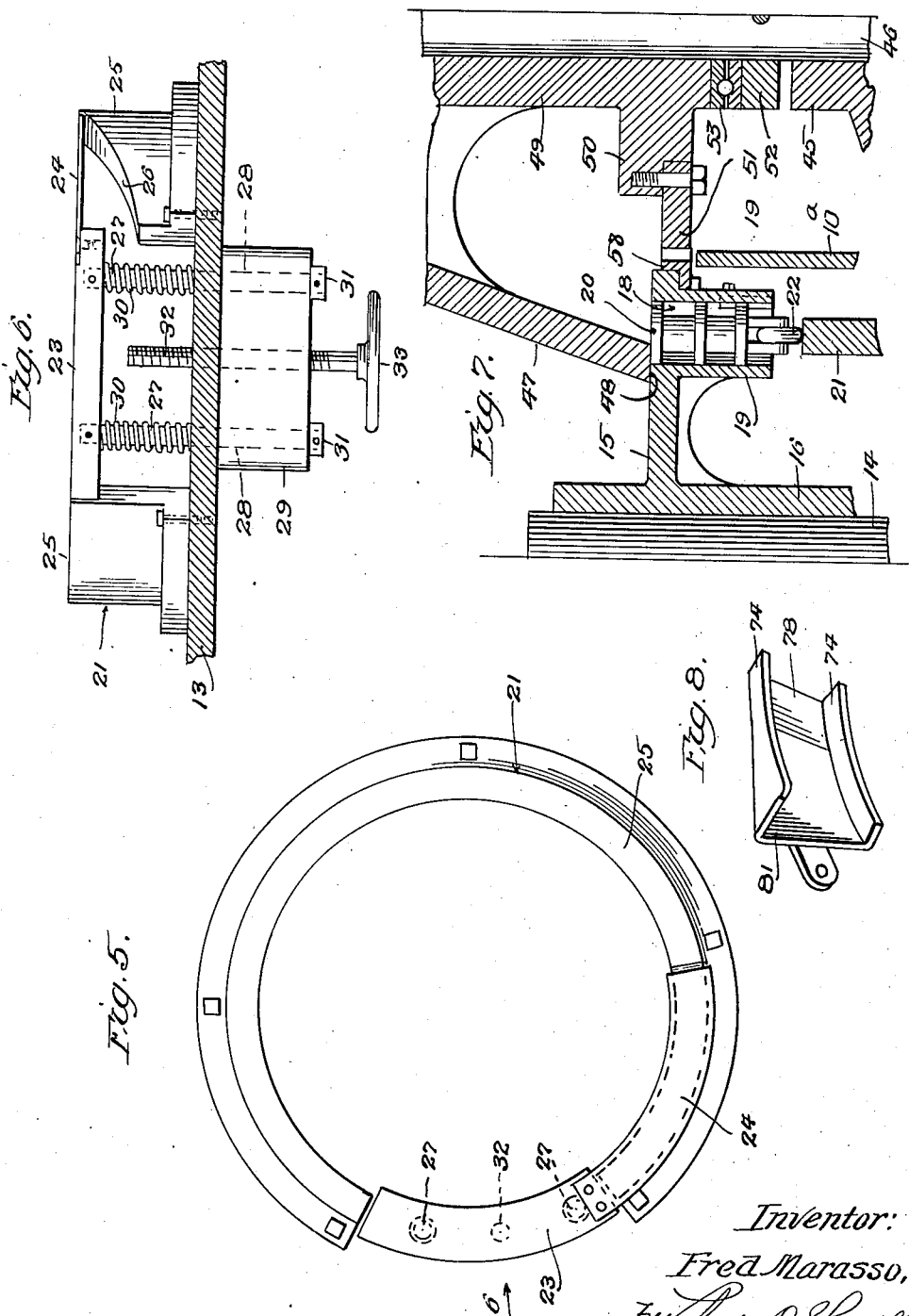

May 31, 1938. F. MARASSO 2,119,018
COMBINED DIVIDER AND ROUNDER
Filed June 26, 1937 4 Sheets-Sheet 4
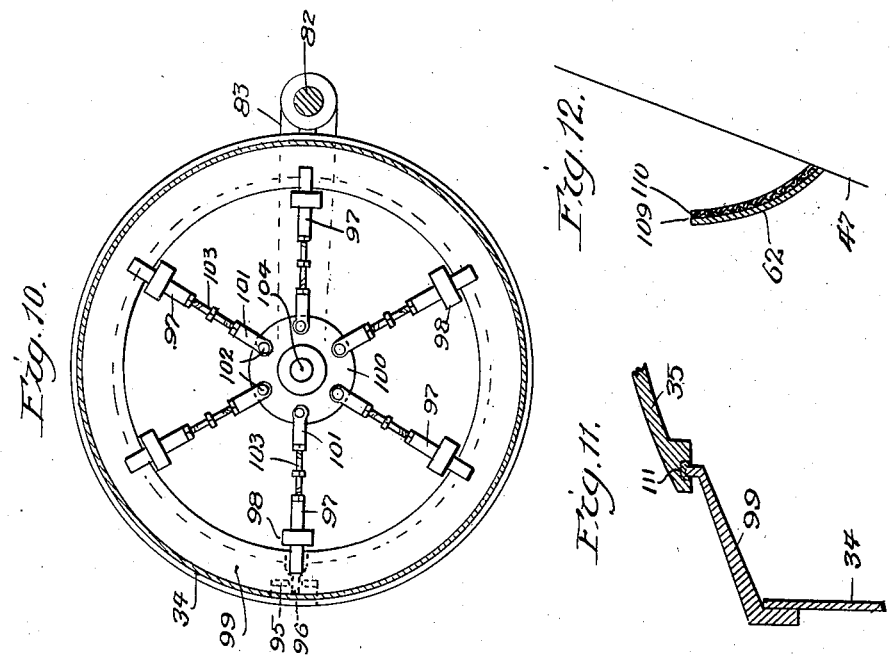
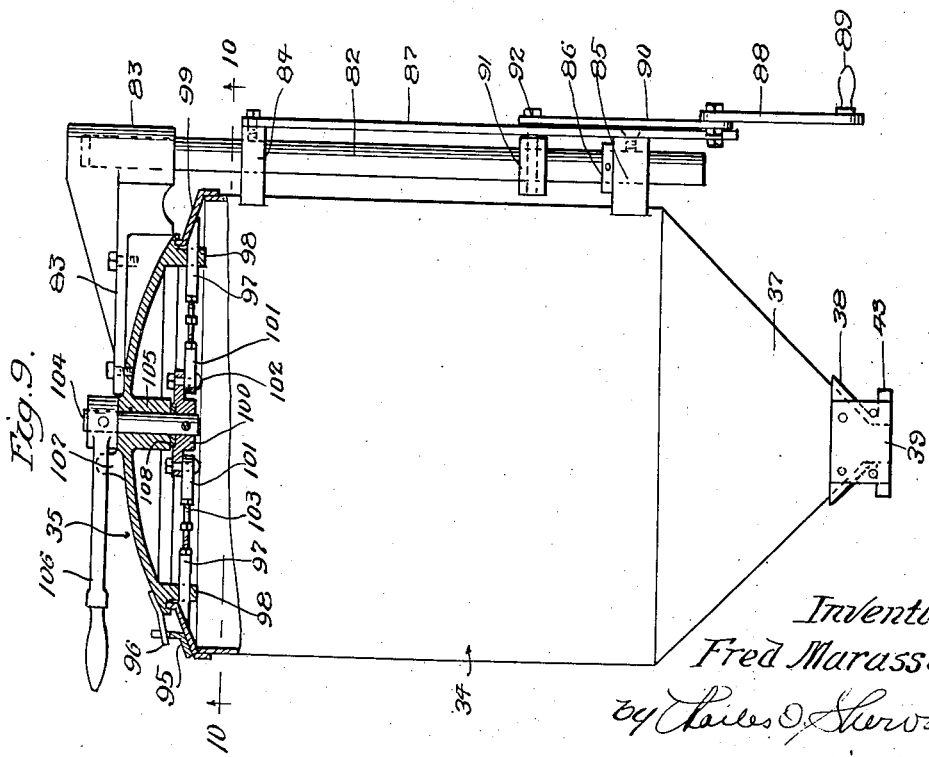
Inventor:
Fred Marasso,
by Charles O. Hervey
his Atty.

Patented May 31, 1938

2,119,018

UNITED STATES PATENT OFFICE 2,119,018

COMBINED DIVIDER AND ROUNDER

Fred Marasso, Joliet, Ill., assignor to Union Machinery Company, Joliet, Ill., a corporation of Illinois Application June 26, 1937, Serial No. 150,566

10 Claims. (Cl. 107—4)

This invention relates to combined dividers and rounders and its principal object is to provide in a unitary structure, means for dividing a batch of dough into measured dough lumps and means for rounding up the lumps. Another object is to provide a combined divider and rounder wherein the measured dough lumps are carried directly to the rounding-up mechanism by the dividing mechanism. Another object is to provide a rounder with self-contained means for molding the dough lumps into rolls or other shapes. Another object is to provide a rounder in which the dough lumps may be rounded up and discharged therefrom upon a conveyor or other receiving element, and having means whereby the rounded-up dough lumps may be further acted upon as, for instance, by rolling them into rolls and discharging the rolled dough pieces upon a suitable receiving element. With these and other objects and advantages in view, this invention consists in the several novel features hereinafter fully set forth and claimed.

The invention is clearly illustrated in the drawings accompanying this specification, in which:

Fig. 2 is a view, partly in plan and partly in horizontal section, of the machine, the line of section being indicated at 2—2 in Fig. 1.

Fig. 3 is a fragmental end elevation of the molding and rounding-up elements of the machine looking in the direction of the arrow 3 in Fig. 1.

Fig. 4 is a fragmental end elevation of the molding and rounding-up elements of the machine looking in the direction of the arrow 4 in Fig. 1.

Fig. 5 is a detail plan of a track which raises the plungers of the dividing elements.

Fig. 6 is an end elevation of said track looking in the direction of arrow 6 in Fig. 5 and showing the platform of the machine in cross-section.

Fig. 7 is a detail, vertical, longitudinal section taken on the line 7—7 of Fig. 2.

Fig. 8 is a fragmental, perspective view of a certain molding element.

Fig. 9 is an end-elevation of the container, partly broken out and looking in the direction of arrow 9 in Fig. 1.

Fig. 10 is a horizontal section taken on the line 10—10 of Fig. 9.

Fig. 11 is a fragmental, detail vertical section, taken through the joint between the container and its cover.

Fig. 12 is a fragmental, detail vertical section through the spiral rounding up element.

Figure 1:
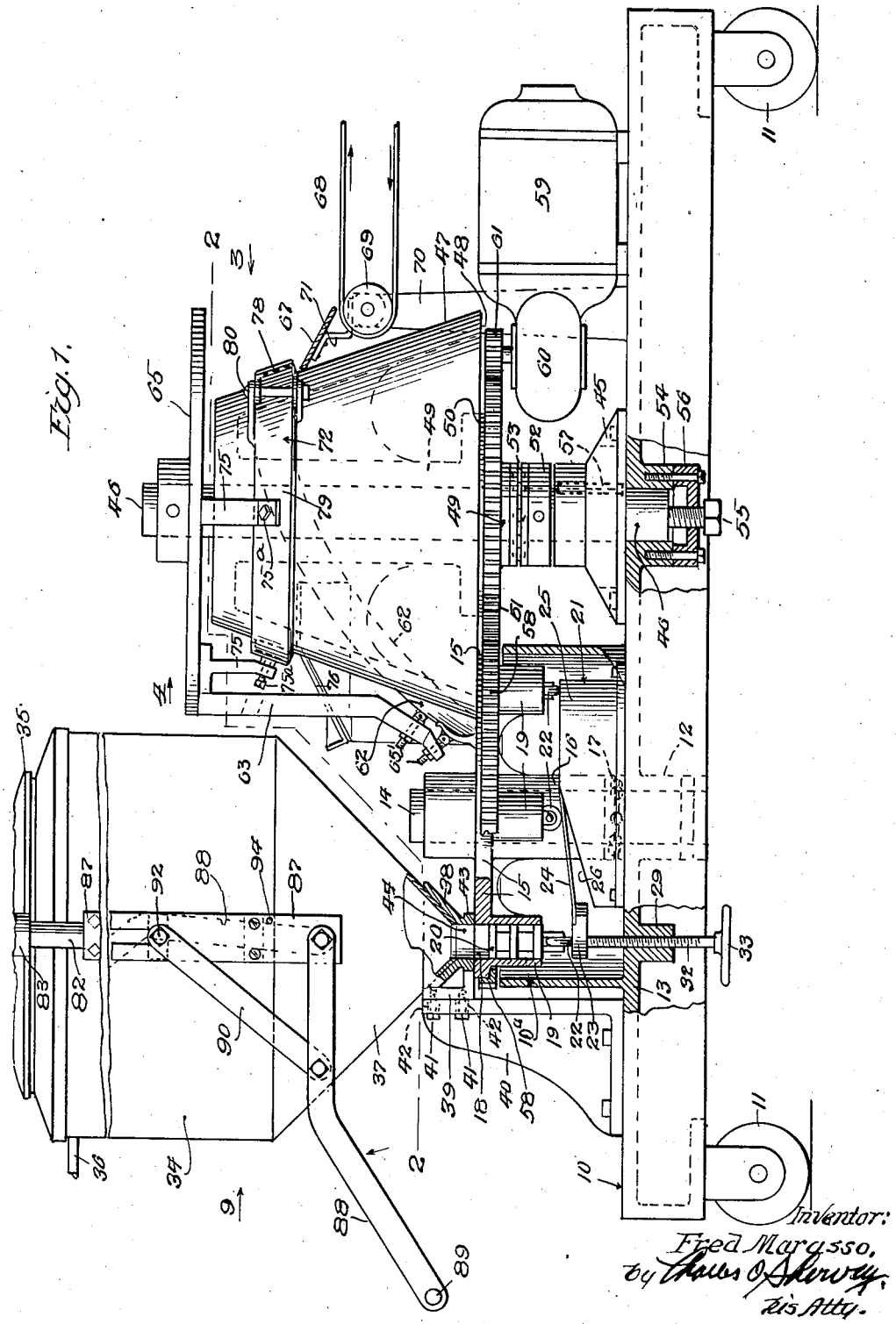
Fig. 1 is a side elevation of a combined divider and rounder, partly broken out and partly in central, vertical section to show parts that otherwise would be hidden from view.

Referring to said drawings, which illustrate a simple embodiment of the invention, the reference character 10 designates a rectangular base mounted upon wheels 11, whereby the machine may be conveniently moved about. Stationarily secured in a boss 12 which projects down from the platform 13 of the base is an upright shaft 14 upon which is rotatively mounted one element of the divider mechanism, here shown as a table 15, which is formed with a downwardly extending boss 16 that surrounds the shaft 14 and is carried by an end thrust bearing 17 that rests upon the platform 13. In the table 15 are several measuring pockets 18 desirably formed in bosses 19 that project downward from the table 15, and in said pockets are vertically movable plungers 20 20 that form the bottoms of said pockets and serve to eject measured lumps of dough therefrom. The plungers 20 are supported upon an annular sectional track 21 (see Figs. 5 and 6) which extends upward from the platform and the plungers are provided at their lower ends with rollers 22 that run upon the track. An annular wall 10a surrounds the track.

The track is composed of arcuate sections 23, 24, 25, the sections 23, 24 being vertically movable, whereas the section 25 is stationary and bolted to the platform, and at one end is formed with a downwardly inclined part 26 upon which the section 24 rests. The section 24 is composed of relatively thin resilient material and is riveted or otherwise secured to one end of the section 23. The rollers 22 run upon the several sections of the track which are of sufficient height to hold the upper faces of the plungers flush with the upper face of the table. The section 23 determines the depth of the pockets, that is to say, it determines the capacity of the pockets by limiting the downward movement of the plungers therein. The section 23 of the track is provided with downwardly projecting rods 27 rigidly fastened thereto, which are guided in bores 28 formed in a block 29 that projects down from the platform 13, and coiled compression springs 30 surround the upper ends of said rods 27 and are confined under tension between the track section 23 and the platform 13 and urge the track section 23 upward, as is clearly seen in Fig. 6. The rods 27 have heads 31 upon their lower ends which engage with the lower face of the block 29 and limit the upward movement of the section 23 whereby it is held in alignment with the upper edge of the track section 25. An adjustment screw 32 threadedly mounted in the block 29 and provided with a handwheel 33 provides adjustable stop means for limiting the downward movement of the track section 23. In the operation of the machine the rollers 22 run upon the track and when one reaches the track section 23, dough is forced down against the plunger, thereby depressing the plunger and therewith the track section 23 against the tension of the springs until said track section 23 strikes the adjustment screw 32. By turning said adjustment screw, the capacity of the pockets may be varied as desired.

A container 34 is provided for holding a batch of dough which is to be divided into small lumps and said container is provided with a closure 35 which may be tightly secured thereon after the container has been charged with the dough. As a preference, air pressure is employed for forcing the dough down into the measuring pockets and, for this purpose, a compressed air pipe 36 is shown which leads from the top of the container to any suitable source of compressed air supply.

The lower end of the container 34 is desirably in the form of a hopper 37, the lower end of which is secured to and contained within a flaring collar 38 which is provided with a bracket 39 supported upon a standard 40 which is bolted or otherwise secured to the platform 13. The bracket 39 is adjustable vertically on the standard 40 as by bolts 41 and elongated slots 42, and the collar 38 is formed on its lower side with a flat, horizontal flange 43 which closely contacts with the upper face of the table 15. Desirably, the flange is elongated as seen in Fig. 2 and is provided with a discharge opening 44 located directly above the movable track section 23, with which opening the several pockets of the table are brought into register as the table rotates, and whenever a pocket passes the discharge opening 44 from the container, dough is forced against the plunger in the pocket below and the plunger depressed against the action of the springs 30 until the track section 23 encounters the adjustment screw 32. With the use of the cushioned track section 23, the plunger-carrying rollers run from the stationary section of the track to the movable section 23, and the plungers are thereby held in their raised positions by the upwardly urged track section 23 until depressed by the dough forced into them from the container. Consequently, there is no jar occasioned when the rollers encounter the movable track section 23. The table 15 is rotated by any suitable gearing, one type of which will be presently described.

Stationarily mounted in a bearing block 45, bolted or otherwise secured to the platform 13, is an upright shaft 46 upon which is rotatively mounted a rounding-up element 47 of the rounding-up mechanism. The rounding-up element 47 may assume various forms and, as here shown, it comprises a truncated hollow cone that overlaps the table 15 with its lower edge 48 contacting with the upper face of the table. In operation the several pockets pass underneath the overlapping part of the cone. As shown, the cone is formed with an axially disposed hub 49 which surrounds the shaft 46 and is formed adjacent its lower edge with a flange 50, to which is bolted a ring gear 51. Upon the shaft 46 is rigidly secured a collar 52 which supports the cone, the end thrust thereof being taken up by thrust bearing 53 interposed between the collar 52 and hub 49 of the cone.

In order to maintain a close contact between the lower edge of the cone and the upper face of the table, the shaft 46 is adjustable vertically and, as shown, it projects down below the bearing block 45 into a boss 54 formed on the underside of the platform 13 and rests upon an adjustment screw 55 threaded in a block 56 which is bolted or otherwise fastened to the lower side of the boss 54, as shown in Fig. 1. By turning the adjustment screw 55 in the proper direction, the lower edge of the cone 47 may be brought into neat contact with the upper face of the table 15. A key 57 is secured in the bearing block 45 and is seated in a groove formed in the shaft 46 and holds said shaft against rotation but permits it to be raised and lowered.

In the form of the gearing shown, a ring gear 58 is fastened upon the periphery of the table 15 and meshes with the ring gear 51 on the cone. Desirably, the gear ratio is such that the cone rotates at a higher rate of speed than the table and rotates in a direction opposite to the direction of rotation of the table. Desirably, an electric motor 59 mounted on the platform 13 and provided with speed reducing gearing 60 is provided for driving the table and cone. A pinion 61 driven by the speed reducing gearing 60 meshes with the ring gear 51 and directly drives the cone; the ring gear 51 in turn driving the ring gear 58 and table 15. Various types of gearing may, however, be substituted for the one shown and, if desired, the table and cone may be driven by separate motors.

Cooperating with the rounding-up element 47 is a stationary rounding-up element 62, here shown in the form of a spiral trough-like member which extends from a point adjacent the lower edge of the cone to a point adjacent the upper end thereof. The lower edge of the spiral rounding-up member 62 neatly contacts with the table and with the conical face of the rounding-up element 47 and, together with the conical face of the cone, provides a spiral trough along which the measured lumps of dough are rolled and rounded up.

The spiral rounding-up element 62 may be stationarily supported by any suitable means. In the present form of the invention it is supported from arms 63, 64 by threaded stems 65', 65' adjustably mounted in the arms 63, 64 and connected to the spiral rounding-up member 62. The arms 63, 64 project down from a stationary plate 65 which is fastened to the upper end of the shaft 46 by a pin or otherwise.

The spiral rounding-up element 62 terminates at the point indicated by the character 66 in Fig. 2, and the rounded up lumps of dough may be discharged from the rounding-up elements at said point. Below the discharge end of the rounding-up element 62 is an inclined plate 67 upon which the rounded up dough lumps are discharged and below the lower end of the inclined plate may be a conveyor belt 68 which serves to carry the rounded up dough lumps to some other station for a subsequent operation. One end of the conveyor belt 68 is trained around a pulley 69 journaled in bearing brackets 70 carried by the platform and, if desired, the inclined plate 67 may be carried by brackets 71 fastened to the bearing brackets 70.

Sometimes it is desirable to mold the rounded up lumps of dough into cylindrical bodies or rolls, and means are provided for accomplishing this result. As shown, said means comprise the cone 47 and a sectional, channeled, arcuate molding element 72 which extends from the discharge end of the spiral rounding-up element 62, part way around the upper end portion of the cone 47, terminating at the place indicated by the character 73 in Fig. 2, which defines the discharge end of the molding element 72. The molding element is provided with upper and lower flanges 74 which contact with the conical face of the cone 47, thereby providing an annular channel through which the rounded up dough lumps are rolled and given a cylindrical form. The molding element 72 is supported from the plate 65 by downwardly extending bracket arms 75 secured to the plate 65 and having bolts 75ᵃ threaded in their lower ends and engaging in socket members formed on the outer face of the molding element 72.

An inclined table or receiving element 76 extends downward from the discharge end of the molding element 72 toward the platform 13 and receives the molded dough rolls. The table 76 may be supported from the platform by brackets 77.

To enable the rounding-up means to merely round up the dough lumps and not mold them into cylindrical form, the section 78 of the molding element 72 is hinged upon the section 79 thereof by a hinge 80 and the free end of the section 78 is fastened to the spiral rounding-up element 62 by a bolt and wing nut 80ᵃ. The end of the section 78 adjacent the spiral rounding-up element 62 is bulged outward, as seen at 81 in Fig. 8, so as to provide an unobstructed opening through which the rounded up dough lumps enter the molding element 72 when the same is being used. When it is desired to merely round up the lumps of dough, the section 78 is swung back upon its hinge, thereby uncovering the discharge end of the spiral rounding-up element 62, permitting the rounded up dough lumps to discharge therefrom upon the inclined plate 67. When the molding element 72 is in use, the cone rolls the rounded up lumps of dough from the rounding-up element 62 into the molding element 72 and rolls them therethrough to the discharge end thereof from which they fall upon the inclined receiving table 76.

Novel means are provided for manipulating the cover of the container and for locking it down air-tight thereon. As shown, the cover 35 is dome-shaped and is carried by an upright rod 82, the upper end of which enters a socket in an arm 83, which is rigidly fastened to the top of the cover. The rod extends down along the side of the container and is slidably held in lugs 84, 85 that are secured to and project from the side of the container. A collar 86 fast on the rod 82 rests on the lug 85, and normally supports the rod thereon. Bolted or otherwise fastened to said lugs is an upright slotted bar 87, upon the lower end of which is fulcrumed a lever 88, having a handle 89 on its free end. Connecting the lever with the rod is a link 90 whereby the rod, and therewith the cover, may be raised or lowered. The connection between the upper end of the link and rod comprises a collar 91 on the rod, and a bolt 92 which extends through the upper end of the link, through the slot in the bar 87 and through the collar 91 and rod 82.

Normally the cover rests upon the container and the rod is supported by the lug 85. To uncover the container, the lever 88 is swung upward, thereby raising the link 90 and rod 82 and therewith the arm 83 and cover 35. If desired, a stop 94 may be provided on the bar 87 in position to hold the lever in its raised position. When raised, the cover may be swung to one side of the container, whereby a batch of dough may be deposited into it from above. To close the cover it is swung back over the container and the lever 88, lowered to its normal position. In order to center the cover on the container, a forked centering member 95 is fastened to the top of the container and a finger 96 is fastened to the cover in position to center the cover when the finger enters the notch of the forked centering member 95.

To lock the cover tightly on the container, simple locking means has been provided. As shown, the means comprises a series of radially disposed lock bolts 97 which are guided in lugs 98 that project down from the cover adjacent its margin. The lugs are tapered along their upper outer ends and engage with the under side of a correspondingly tapered ring 99 which is welded or otherwise fastened to the upper end of the container wall. The bolts are connected to a rotatable disc 100 by links desirably comprising link members 101 pivotally connected with the disc by bolts 102 and threaded adjustment rods 103, having right and left threads engaging the bolts 97 and link members 101. The disc is rigidly secured to a stem 104 rotatively mounted in a hollow boss 105 formed on the cover. The stem protrudes from the upper side of the cover and has a handle 106 fastened upon it, by means of which the stem and discs may be partially rotated to withdraw and project the bolts. A stop 107 is positioned on the cover to limit the throw of the handle in the locked position of the bolts, whereby the pivotal connection between the links and disc may be moved past the dead center to positively lock the bolts in their projected position.

To unlock the cover, the handle 106 is turned away from the stop, thereby turning the disc and retracting the bolts from their engagement with the ring 99.

To prevent air leakage through the clearance space between the stem 104 and the boss 105, a soft metal washer 108 is interposed between the boss and disc. A gasket 111 on the underside of the cover engages with an upturned rim of the ring 99 and makes an air tight joint between the container and cover.

In order to permit the dough lumps to roll smoothly along the spiral rounding up element, I apply paraffin to the working surface of said rounding up element. With the use of a paraffin liner, there is no likelihood for the dough lumps to adhere to said spiral rounding up element, and the rotating rounding up element is capable of acting more effectively in rolling the dough lumps up the spiral rounding up element.

In Fig. 12 I have shown a strip of canvas 109 glued or otherwise secured to the working face of the spiral rounding up element 62, to the face of which canvas strip is applied a coating of paraffin or the like 110. Instead of the canvas strip, wire mesh may be used or the working face of the spiral rounding up element may be roughened and the paraffin applied to the wire mesh or the roughened surface of the spiral rounding up element. The paraffin provides a smooth surface for the spiral rounding up element and enables the rotating rounding up element to more effectively roll the dough lumps up the spiral rounding up element.

In the operation of the machine, the table 15 and cone 47 rotate in the directions indicated by the arrows thereon in Fig. 2 and, as each measuring pocket passes underneath the discharge opening from the container, it is filled with dough, the plunger therein being forced downward to the limit of its downstroke. As the table continues to rotate, the pocket passes from underneath the discharge end of the container and the roller of the plunger runs up the track section 24, which at that time is inclined, thereby raising the plunger until the roller runs upon the track section 25, at which time the upper face of the plunger has been raised flush with the upper face of the table and the lump of dough has been discharged from the pocket and is resting upon the plunger. This takes place before the dough lump encounters the rotating rounding-up element 47 and when it does encounter it, the rounding-up element 47 sweeps it off the plunger and into the space between the lower end of the stationary rounding-up element 62 and the conical face of the rotating rounding-up element 47, the continued rotation of said rounding-up element rolling the dough lump up the trough between the coacting rounding-up elements 47, 62, where the dough lump is rounded up, and if the molding element section 78 is open, the rounded up dough lump is discharged upon the inclined plate 67. With the molding element section 78 closed, the rounded up dough lump is rolled into the molding element 72 and through the same where it is rolled into a roll and discharged therefrom upon the table 76.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. In a combined divider and rounder, a base, divider mechanism, having a rotating measuring table mounted on the base, in combination with rounding-up mechanism having a rotating rounding-up element mounted on the base and overlapping said table and contacting with the face thereof, and a stationary coacting rounding-up element extending from the face of the table partially around the rotating rounding-up element and forming therewith a rounding-up trough into which the measuring table carries measured dough lumps.

2. In a combined divider and rounder, a base, divider mechanism mounted thereon and having a rotating table provided with measuring pockets in which dough is measured and provided with means for ejecting the measured dough from the pockets so as to lie flush with the top of the table, in combination with rounding-up mechanism mounted upon the base, and having a rotating rounding-up element mounted on the base and overlapping the table, and contacting therewith, and a stationary cooperating rounding-up element, said rounding-up elements forming between them a trough in which the dough lumps are rounded up, the table acting to carry measured dough lumps into engagement with the rounding-up face of the rotatory rounding-up element whereby the dough lumps are carried to the entrance to the trough between the rotatory and stationary rounding-up elements.

3. In a combined divider and rounder, a base, divider mechanism mounted thereon and having a rotating table provided with measuring pockets and plungers therein, and there being means to raise the plungers flush with the face of the table, in combination with rounding-up mechanism mounted on said base, said rounding-up mechanism comprising a rotating rounding-up element overlapping the table and contacting with the face thereof, and a stationary cooperating rounding-up element extending from the table part way around the rotating rounding-up element, the rotating table acting to carry measured dough lumps to the rotating rounding-up element whereby the dough lumps are carried to the stationary coacting rounding-up element.

4. In a combined divider and rounder, a base, divider mechanism mounted on the base, said divider mechanism including a rotary table having measuring pockets and plungers therein, and means to raise the plungers flush with the face of the table, and a dough container having a discharge opening with which the pockets are brought into register, in combination with rounding-up mechanism mounted on the base, said rounding-up mechanism including a rotating rounding-up element which overlaps the table with an edge in contact therewith, and a stationary cooperating rounding-up element contacting with the face of the table and with the face of the rotating rounding-up element.

5. In a combined divider and rounder, a base, a rotating table mounted thereon, said table having measuring pockets therein, plungers, one in each pocket, means to raise said plungers flush with the face of the table, and a dough container having a discharge opening with which the pockets are caused to register, in combination with a rounding-up element overlapping said table with an edge in contact therewith, said rotating rounding-up element having a conical face, and a stationary, spiral, cooperating rounding-up element contacting with the table and with the conical face of the rounding-up element.

6. In a combined divider and rounder, a base, divider mechanism mounted on the base, said divider mechanism including a rotating table having measuring pockets and plungers therein, means to raise the plungers flush with the face of the table and a dough container having a discharge opening with which the pockets are brought into register, in combination with a conical rounding-up element rotatably mounted on the base, said rounding-up element overlapping the table with its lower edge in contact therewith and a stationary spiral coacting rounding-up element contacting with the face of the table and with the conical face of the rotating rounding-up element.

7. In a combined divider and rounder, a base, divider mechanism mounted thereon and including a rotatable table, in combination with a rotating, conical, rounding-up element mounted on the base and a stationary, spiral, coacting rounding-up element contacting with the rotating table and rounding-up element.

8. In a combined divider and rounder, a base, divider mechanism mounted on the base, said divider mechanism including a rotating table having measuring pockets and plungers therein, an annular track underlying the plungers and having a depressible section and a stationary section arranged to support the plungers flush with the face of the table, and a container having a discharge opening, with which the pockets are brought into register, in combination with a rotating, conical, rounding-up element and a stationary, spiral, coacting rounding-up element contacting with the face of the table and the conical face of the rotatable rounding-up element.

9. In a combined divider and rounder, a base, divider mechanism mounted thereon and having a rotating table provided with measuring pockets and plungers therein, there being means to raise said plungers flush with the face of the table, and a dough container having a discharge opening, with which the pockets are brought into register, in combination with a stationary upright shaft mounted on said platform, a rotating, conical, rounding-up element rotatably mounted on said shaft, a plate stationarily secured to said shaft above the conical rounding-up element, said plate having arms depending therefrom, and a stationary, spiral, coacting rounding-up element supported by said arms in contact with the rotating table and rotating, conical rounding-up element.

10. In a combined divider and rounder, a base, divider mechanism mounted on the base, said divider mechanism including a rotating table having measuring pockets and plungers therein, a ring gear secured to said table, means to raise the plungers flush with the face of the table, and a dough container having a discharge opening, with which the pockets are brought into register, in combination with rounding-up mechanism mounted on the base, said rounding-up mechanism including a rotating rounding-up element which overlaps the table with an edge in contact therewith, a ring gear secured to said rotating rounding-up element and meshing with the ring gear on the table, a stationary, spiral, cooperating rounding-up element contacting with the table and rotating rounding-up element, and means to stationarily support said coacting rounding-up element.

FRED MARASSO.